(12) United States Patent
Haas (10) Patent No.: US 11,287,182 B2
(45) Date of Patent: Mar. 29, 2022

(54) METHOD FOR POWER GENERATION DURING THE REGASIFICATION OF A FLUID BY SUPERCRITICAL EXPANSION

(71) Applicant: Siemens Energy Global GmbH & Co. KG, Munich (DE)

(72) Inventor: Sebastian Haas, Forchheim (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/761,699

(22) PCT Filed: Oct. 24, 2018

(86) PCT No.: PCT/EP2018/079128
§ 371 (c)(1),
(2) Date: May 5, 2020

(87) PCT Pub. No.: WO2019/101461
PCT Pub. Date: May 31, 2019

(65) Prior Publication Data
US 2021/0180861 A1    Jun. 17, 2021

(30) Foreign Application Priority Data
Nov. 27, 2017  (EP) .................................... 17203813

(51) Int. Cl.
*F25J 1/02* (2006.01)
*F01K 3/00* (2006.01)
(Continued)

(52) U.S. Cl.
CPC ............... *F25J 1/0282* (2013.01); *F01K 3/00* (2013.01); *F01K 7/38* (2013.01); *F01K 13/02* (2013.01); *F01K 25/10* (2013.01); *F02C 1/02* (2013.01)

(58) Field of Classification Search
CPC ..................................................... F01K 25/10
See application file for complete search history.

(56) References Cited

U.S. PATENT DOCUMENTS

| | | | |
|---|---|---|---|
| 3,523,421 A | 8/1970 | Schuetzenduebel | |
| 4,995,234 A * | 2/1991 | Kooy | F17C 9/04 60/648 |

(Continued)

FOREIGN PATENT DOCUMENTS

| | | |
|---|---|---|
| CN | 1447016 A | 10/2003 |
| ES | 2580879 A1 * | 8/2016 |

(Continued)

OTHER PUBLICATIONS

PCT International Search Report and Written opinion of International Searching Authority dated Jan. 24, 2019 corresponding to PCT International Application No. PCT/EP2018/079128 filed Oct. 24, 2018.

*Primary Examiner* — Laert Dounis (57) ABSTRACT

An apparatus and method for power generation during regasification, having a tank for a cryogenic fluid, a first pump connected to the tank via a first line, a first heat exchanger connected to the first pump via a second line, and a second heat exchanger connected downstream of the first heat exchanger, and a first turbine connected immediately downstream of the second heat exchanger, wherein a third line branches off from the first turbine and opens into the first heat exchanger, and a fourth line branches off from this first heat exchanger and opens into the second line, wherein a second pump is connected into the fourth line.

16 Claims, 5 Drawing Sheets

(51) Int. Cl.
    *F01K 13/02*        (2006.01)
    *F01K 25/10*        (2006.01)
    *F02C 1/02*         (2006.01)
    *F01K 7/38*         (2006.01)

(56)              References Cited

U.S. PATENT DOCUMENTS

2006/0254251 A1    11/2006  Yamada
2007/0101732 A1*    5/2007  Mak ..................... F25J 3/0233
                                                           62/50.3
2008/0190106 A1     8/2008  Mak
2009/0277219 A1    11/2009  Mak et al.
2010/0154471 A1*    6/2010  Brown .................. F25J 3/0233
                                                           62/620
2012/0151926 A1     6/2012  Labbe
2015/0000280 A1*    1/2015  Harris ..................... F02C 1/08
                                                           60/651

FOREIGN PATENT DOCUMENTS

GB              946640 A   *  1/1964  ............ F01K 25/10
GB             2498382 A      7/2013
JP            57076205 U   *  5/1982
JP           H05302504 A     11/1993
WO        WO-2019129338 A1 *  7/2019  ............ F01K 25/10

* cited by examiner

METHOD FOR POWER GENERATION DURING THE REGASIFICATION OF A FLUID BY SUPERCRITICAL EXPANSION

CROSS REFERENCE TO RELATED APPLICATIONS

This application is the US National Stage of International Application No. PCT/EP2018/079128 filed 24 Oct. 2018, and claims the benefit thereof. The International Application claims the benefit of European Application No. EP17203813 filed 27 Nov. 2017. All of the applications are incorporated by reference herein in their entirety.

FIELD OF INVENTION

The invention relates to a device for power generation during regasification and a corresponding method for power generation.

BACKGROUND OF INVENTION

In power station construction, the trend is moving away from large, fossil-fueled power stations toward renewable energy generation, such as wind, photovoltaics, etcetera. In addition, decentralized energy production is also becoming more significant.

In order to comply with the requirements for network stability and supply reliability, storage solutions will in future become increasingly important. In this instance, in addition to the specific requirements of the respective application, the economic viability is as always at the forefront. Energy stores should be durable and rapidly available, not pollute the environment with noxious substances, be independent of the geographic circumstances, have a large power range, energy content and a high degree of efficiency and at best further be cost-effective.

One possibility is energy storage in the form of liquid air (LAES=liquid air energy storage). The LAES technology is still in the initial phase and there still appears to be potential for improvement and additional cost reductions. In summary, the LAES method comprises purely for a storage process an air liquefier, a tank for liquid air and a reconversion unit in which the liquid air is pumped at high pressure, evaporated and expanded in a turbine in multiple stages with intermediate heating. In order to increase the degree of efficiency, the compression heat produced during the air liquefaction is stored and used in the reconversion cycle to bring the air to a higher temperature prior to entering the turbine.

In the same manner, in the reconversion cycle during evaporation of the air, "cold" which occurs can be stored in order to minimize the energy consumption in the liquefaction cycle.

In addition, there are also combinations of LAES with other methods, such as, for example, gas turbine processes. Furthermore, cold which is otherwise discarded, for example, from liquid gas evaporators, can advantageously be incorporated in LAES. The same applies to low-value waste heat from industrial processes which, as a result of the small lower process temperature of the LAES method, can still be used in an economical manner.

It is possible to mention as a cold store organic compounds which are liquefied in counter-current to the evaporated air.

Above all, the reduction of the investment costs appears to be currently important for a commercial breakthrough.

Natural gas is liquefied for transport purposes, for which a large amount of energy has to be expended. In LNG terminals, liquid natural gas (LNG) is brought to pressure, evaporated and introduced into a pipeline.

In order to use the potential of the cold provided in the liquid natural gas to produce power and to recover a portion of the energy expended for the liquefaction, there have previously been only methods which provide a low degree of efficiency and/or which are costly and complex. Generally, methods are used which require additional operating media and which contain a large number of components. The availability is low and the complexity all the higher as a result.

SUMMARY OF INVENTION

An object of the invention is to provide a device and a method for storage and reconversion with a high degree of efficiency which is at the same time also cost-effective, simple and reliable.

The invention achieves the objective relating to the device in that it makes provision, in such a device for power generation during regasification comprising a tank for a cryogenic fluid, a first pump which is connected to the tank via a first line, a first heat exchanger which is connected to the first pump via a second line and a second heat exchanger which is arranged downstream of the first heat exchanger, and a first turbine which is arranged directly downstream of the second heat exchanger, for a third line to branch off from the first turbine and to open in the first heat exchanger and for a fourth line to branch off from this first heat exchanger and to open in the second line, wherein a second pump is connected in the fourth line.

In an advantageous embodiment, a third heat exchanger is connected in the second line and in the fourth line upstream of the second pump. This third heat exchanger (recuperator) increases the electrical power which the device can achieve but is not absolutely necessary so that it can also be omitted in order to save investment costs. The electrical power of the device decreases by approximately 1% when the recuperator is omitted.

It is advantageous for a fifth line to branch off from the first turbine and to open in a pipeline. Alternatively and depending on the medium used, however, a gas turbine combustion chamber, a cold store or a blowout duct into the atmosphere after further expansion is also conceivable.

It is further advantageous for a fourth heat exchanger to be connected in the fifth line.

In case the required pipeline pressure is lower than the necessary supercritical expansion pressure, the flow moving toward the pipeline can be expanded in another turbine stage to the level of the pipeline pressure. In this case, a second turbine is connected in the fifth line and the fourth heat exchanger would then be arranged downstream of the second turbine.

In this instance, a heating operation can take place prior to the last expansion stage. That is to say, it is advantageous for a fifth heat exchanger to be arranged upstream of the second turbine in the fifth line.

In an alternative advantageous embodiment, the first heat exchanger, third heat exchanger and introduction location of the fourth line into the second line are integrated in one component.

In an embodiment of the invention, the tank contains liquid natural gas (LNG). However, liquid air, liquid nitrogen, liquid oxygen or liquid argon are fluids which may also be considered.

The basic notion of the invention is that, for example, natural gas be expanded as an operating medium in the turbine to a supercritical pressure. A large partial flow can thereby be guided back again, pumped to pressure and prior to the expansion in the turbine can absorb heat from the environment and/or other processes. Consequently, with the lowest level of complexity, the electrical power can be increased. The return of the partial flow to a pump which operates with sufficiently low power consumption is possible only via a supercritical expansion since in the natural gas/natural gas heat exchanger the two material flows thereby have a similar temperature progression, small temperature differences occur and consequently a good heat transfer can be achieved. The pump entry temperature is thereby sufficiently low and the pump power is correspondingly small.

The objective relating to a method is therefore achieved by a method for power generation in which a fluid is brought to a first pressure and consequently a high-pressure flow is produced, this high-pressure flow is combined with a second fluid flow which is greater than the high-pressure flow, and the resultant total fluid flow is guided to a first heat exchanger, in which the total fluid flow is heated by the second fluid flow, wherein the heated total fluid flow is subsequently further heated in a second heat exchanger by introducing ambient heat and/or waste heat from other processes and the further heated total fluid flow is expanded in a first turbine to a lower but supercritical pressure, wherein the total fluid flow which is discharged from the first turbine is divided into the second fluid flow and into a smaller third fluid flow and the second fluid flow, after it has discharged its heat to the total fluid flow, is brought to the pressure level of the high-pressure flow.

In this instance, it is advantageous for the second fluid flow, before it is brought to the pressure level of the high-pressure flow, to be even further cooled by a third heat exchanger, wherein the high-pressure flow is heated.

Advantageously, the fluid is removed from a tank. The method ultimately relates to the regasification of fluid media which are stored in tanks.

It is advantageous if, by means of a first pump, the fluid removed from the tank is brought to a pressure of over 150 bara.

It is advantageous for the further heating to lead to the highest possible turbine entry temperature. If only ambient heat is available, it is advantageous for the further heating to come as close as possible to the ambient temperature, but to be carried out to at least 5° C. below ambient temperature. It is advantageous for the ambient heat to be removed from air or sea water.

It is further advantageous for the lower but supercritical pressure to be over 70 bara. The advantages of the supercritical expansion have already been set out above.

One possible advantageous use of the third fluid flow is the introduction thereof into a pipeline for further use, for example, when the fluid removed from the tank is liquid natural gas. However, other fluids may also be used in the method according to the invention, such as, for example, liquid air, liquid nitrogen, liquid oxygen or liquid argon.

In order to further improve the degree of efficiency, it may be advantageous for expansion over multiple stages and intermediate heating to take place in the first turbine.

The invention affords the following advantages:—the degree of efficiency is comparatively high; —it is a very simple concept. With little complexity, a robust control and automation can be achieved; —as a result of the low number of components and machines, a significant operational flexibility is possible. Rapid load changes also do not represent a significant problem; —in addition to the fluid itself (for example, natural gas), no additional operating medium is required; —as a result of the low level of complexity, the new method offers a low failure rate and consequently a high level of availability, which is very important for customer acceptance, —in contrast to other theoretically discussed methods in literature, no expenditure for the new development of components is required; —as a result of the significant amount of heat transmitted between the (for example) natural gas flows, the temperature of the natural gas which still has to be heated by ambient heat is already very high. As a result, there are produced more cost-effective heat exchangers since the freezing of seawater or freezing out of air moisture clearly presents fewer problems.

Both for planned LNG terminals and for existing terminals, complete solutions for power generation during regasification can be provided as retrofitting.

From a customer viewpoint, there is the possibility, with clear investment costs, to significantly reduce the operating costs since with the new solution the inherent requirement can be reduced and where applicable excess power can even be supplied to the network.

In comparison with conventional regasification solutions in which a portion of the natural gas is burned for the evaporation, the economic viability is increased significantly since the total flow can now be introduced into the pipeline and power is additionally produced.

BRIEF DESCRIPTION OF THE DRAWINGS

The invention is explained in greater detail by way of example with reference to the drawings. In the drawings which are schematic and not to scale.

DETAILED DESCRIPTION OF INVENTION

Figure 1:
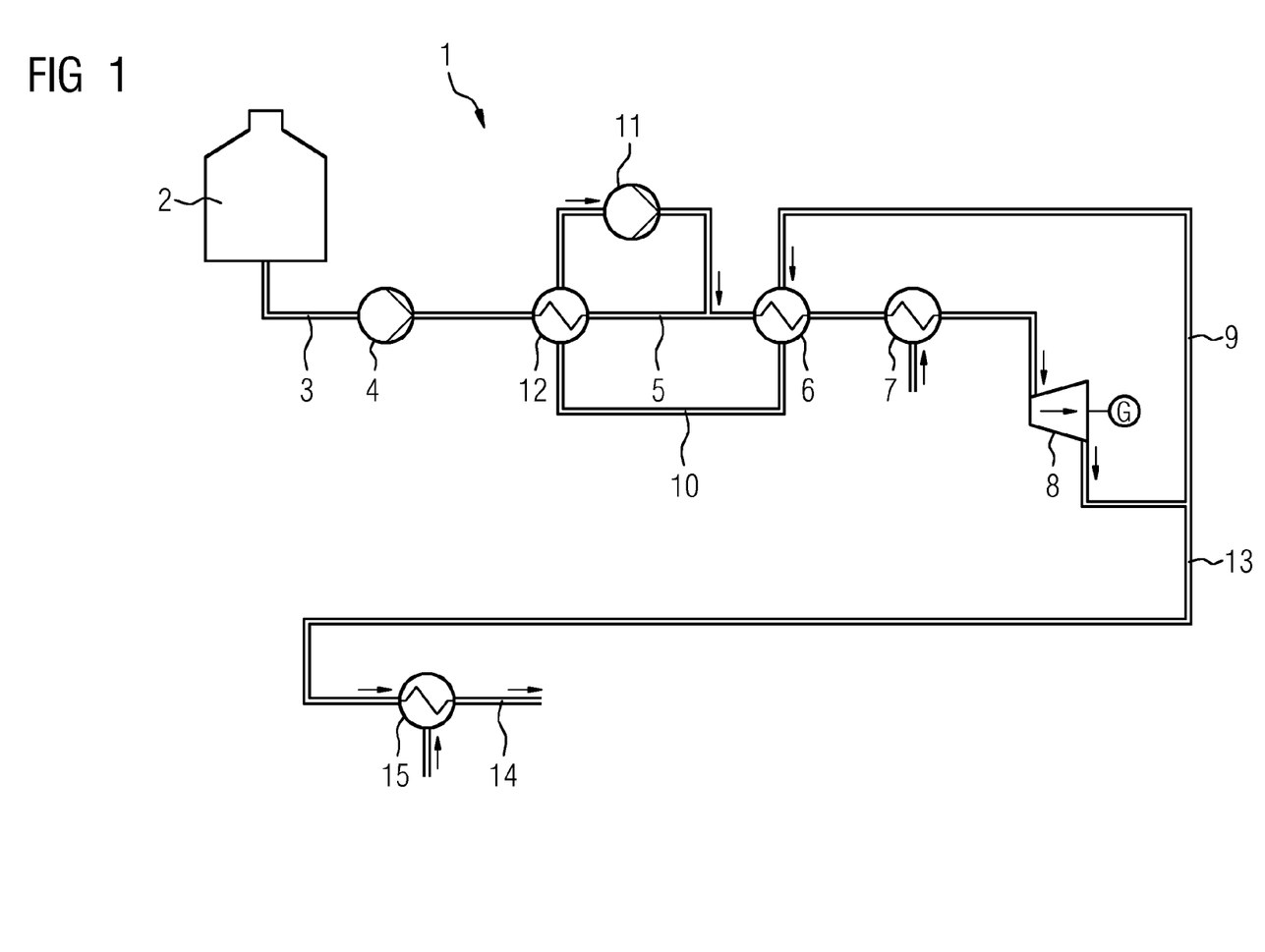
FIG. 1 shows a basic circuit for the process for power generation according to the invention.

FIG. 1 shows schematically and by way of example the basic circuit for the device 1 for power generation during regasification according to the invention. The device 1 comprises a tank 2 for a cryogenic fluid, advantageously liquid natural gas (LNG), but liquid air, liquid nitrogen, liquid oxygen or liquid argon are also possible. A first pump 4 is connected to the tank 2 by means of a first line 3. A second line 5 connects the first pump 4 to a first heat exchanger 6, downstream of which a second heat exchanger 7 is arranged, downstream of which a first turbine 8 is in turn arranged. According to the invention, a third line 9 branches off from the first turbine 8 and opens in the first heat exchanger 6, from which a fourth line 10 branches off in turn and opens in the second line 5.

A second pump 11 is arranged in this fourth line 10 and, upstream of the second pump 11, a third heat exchanger 12. The third heat exchanger 12 is further connected in the second line 5.

In the embodiment of FIG. 1, a fifth line 13 branches off from the first turbine 8 and opens in a pipeline 14. Furthermore, a fourth heat exchanger 15 is connected in the fifth line 13.

Figure 2:
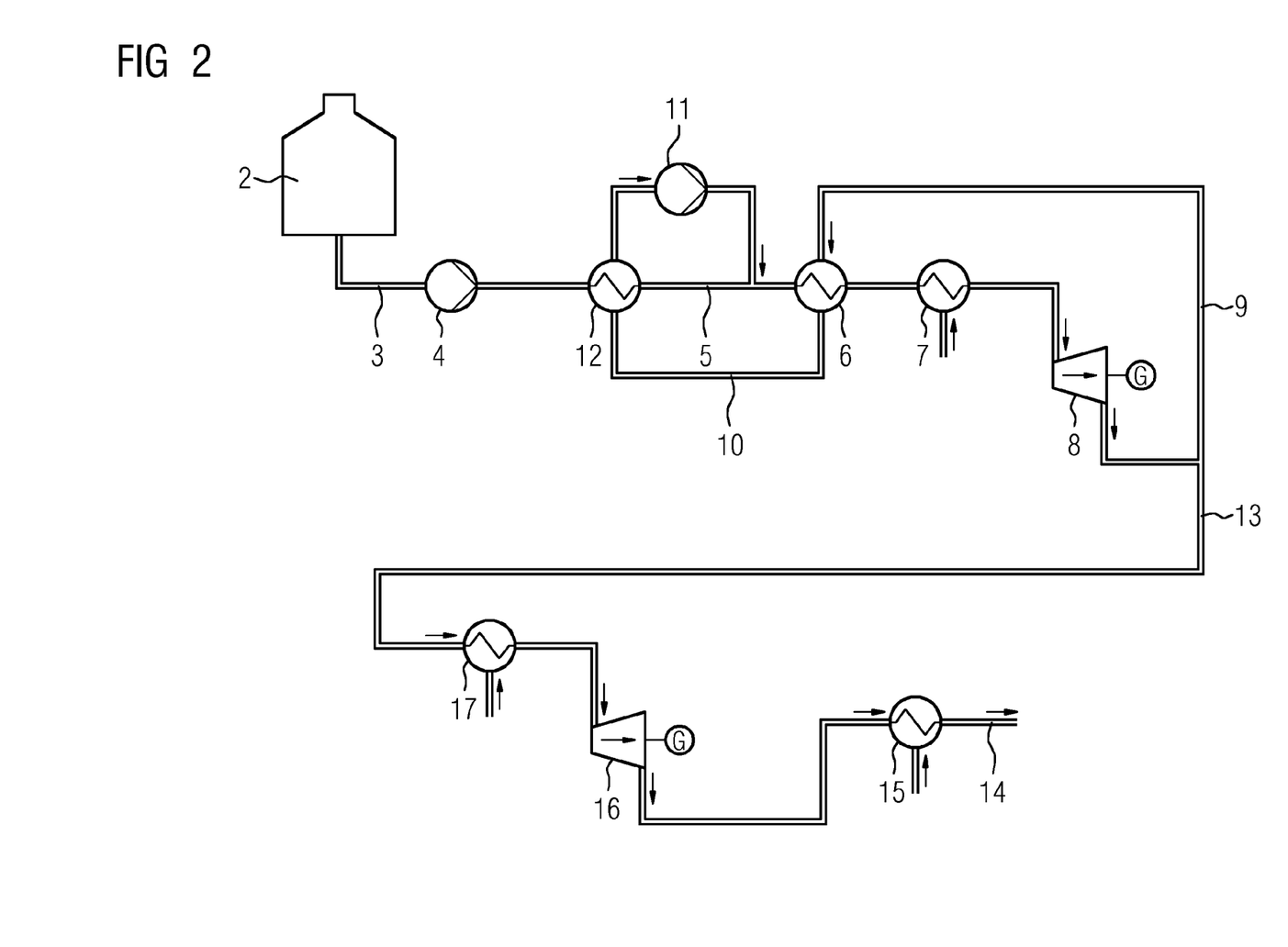
FIG. 2 shows a circuit for lower pipeline pressure.

The circuit of FIG. 2 is optimized for a lower pipeline pressure. In this instance, a second turbine 16 is connected in the fifth line 13, wherein the fourth heat exchanger 15 is arranged downstream of the second turbine 16. Furthermore, a fifth heat exchanger 17 is arranged upstream of the second turbine 16 in the fifth line 13.

Figure 3:
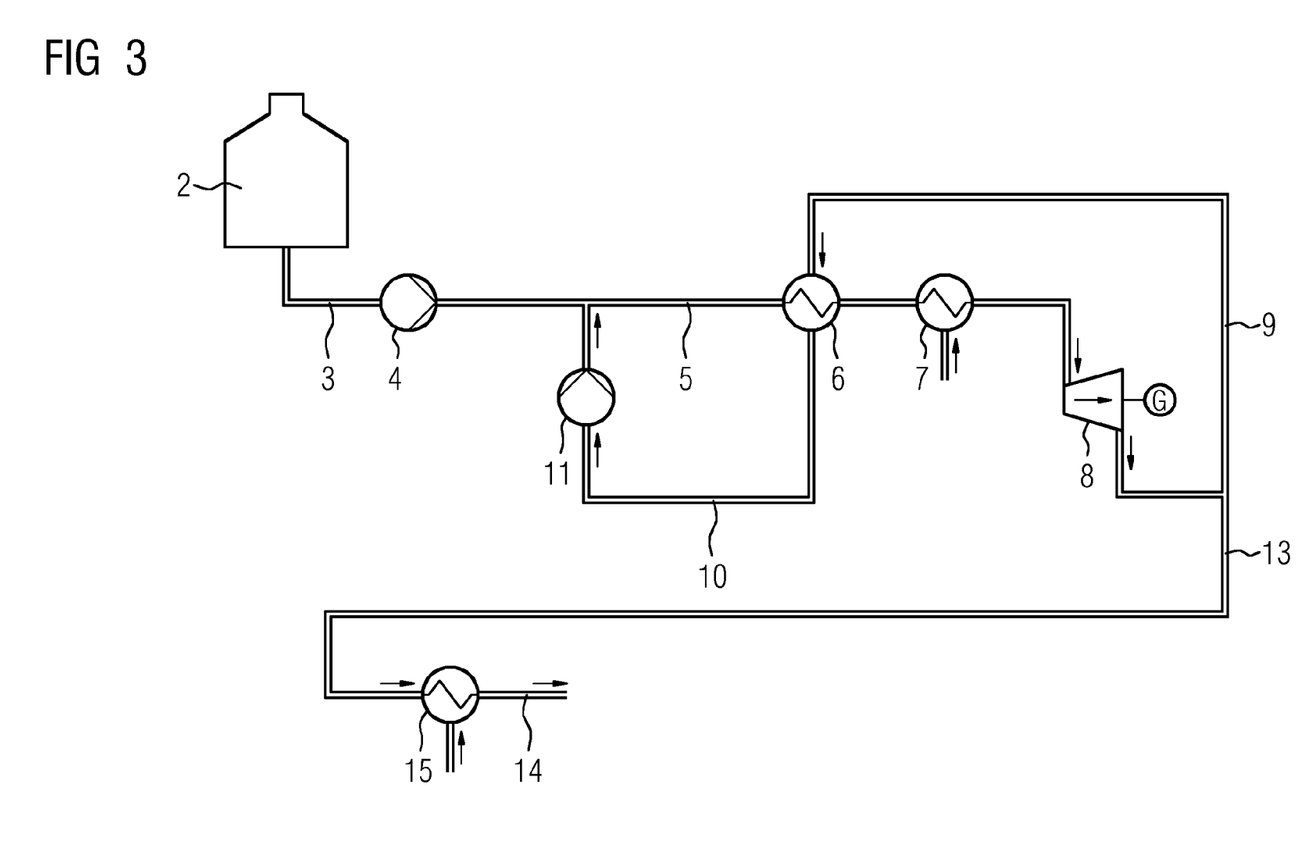
FIG. 3 shows a circuit for cost optimization by omitting the recuperator.

The embodiment of FIG. 3 serves to optimize costs. The third heat exchanger 12 in the line 10 is omitted. The fluid reaches the second pump 11 directly from the heat exchanger 6 before it is returned to the second line 5.

Figure 4:
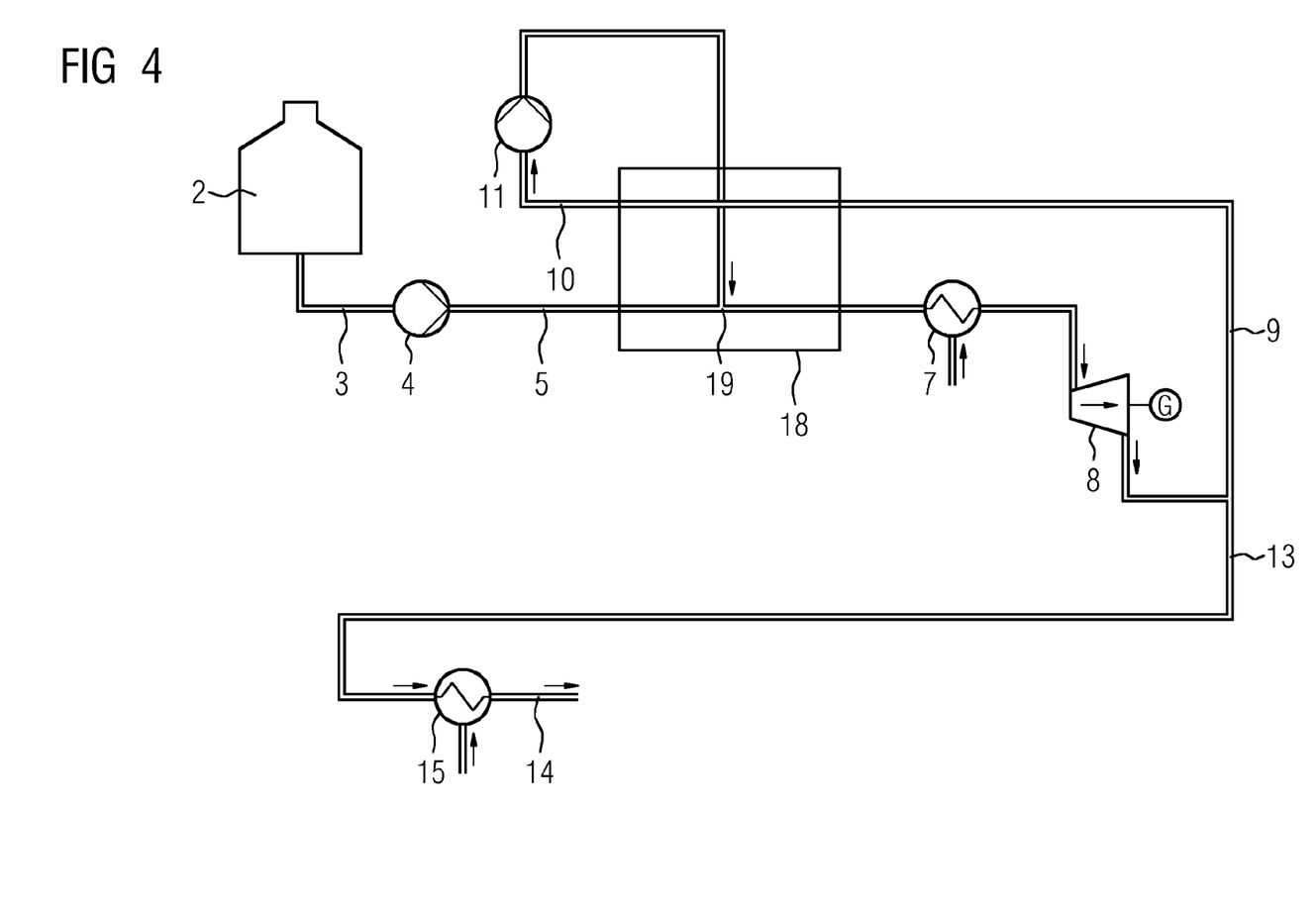
FIG. 4 shows an embodiment with an integrated heat exchanger and FIG. 5 is a flow chart for the method according to the invention.

FIG. 4 finally shows an embodiment with an integrated heat exchanger 18, that is to say, a first heat exchanger 6, third heat exchanger 12 and introduction location 19 of the fourth line 10 into the second line 5 are integrated in one component.

Figure 5:
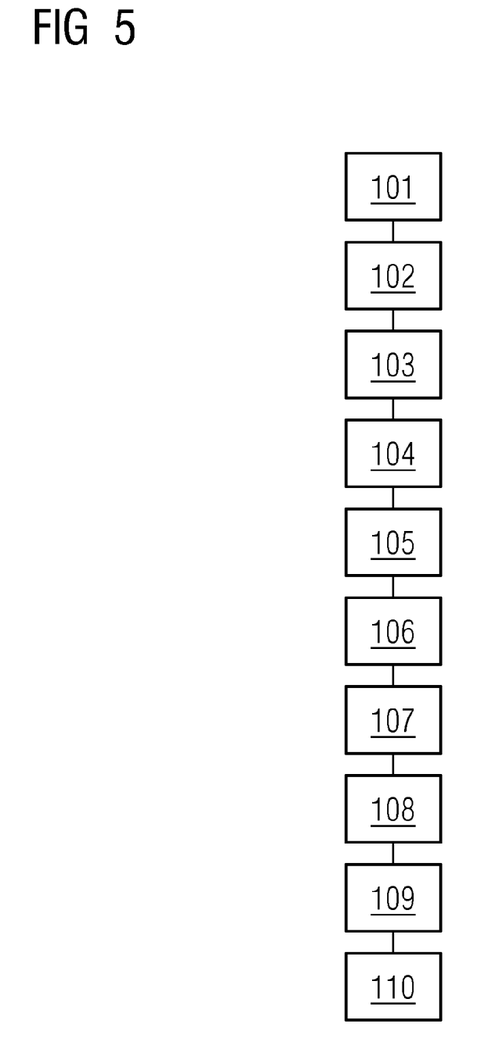

FIG. 5 shows a diagram relating to the method for producing power. In a first step 101, the fluid—liquid air, liquid natural gas, liquid nitrogen, liquid oxygen or liquid argon—is removed from a tank 2.

In a second step 102, the fluid removed from the tank 2 is brought to a first pressure and consequently a high-pressure flow is produced. This first pressure is above 150 bara.

This high-pressure flow is combined in a third step 103 with a second fluid flow, which is greater than the high-pressure flow.

In a fourth step 104, the resulting total fluid flow is guided to a first heat exchanger 6, in which the total fluid flow is heated by the second fluid flow.

In a fifth step 105, the heated total fluid flow is further heated in a second heat exchanger 7 by introducing ambient heat and/or waste heat from other processes. In the case of ambient heat, this can be carried out via air or, for example, sea water and the temperature which can be reached should come as close as possible to the ambient temperature. The temperature which can be reached is dependent on the temperature differences of the heat exchangers used. The target temperature should be as high as possible, but no more than 5° C. below the ambient temperature.

In a sixth step 106, the total fluid flow which is further heated is expanded in a first turbine 8 to a lower, but supercritical pressure. This pressure is typically above 70 bara.

The steps five 105 and six 106 can be repeated depending on the embodiment so that a multi-stage expansion and intermediate heating are carried out in the first turbine 8.

In a seventh step 107, the total fluid flow discharged from the first turbine 8 is divided into the second fluid flow and into a smaller third fluid flow.

In an eighth step 108, the second fluid flow discharges heat to the total fluid flow.

In a ninth step 109, the second fluid flow is brought to the pressure level of the high-pressure flow before it is combined with it (step 3).

In a tenth step 110, the third fluid flow in introduced into a pipeline 14.

The invention claimed is:

1. A device for power generation during regasification, comprising:
    a tank for a cryogenic fluid,
    a first pump which is connected to the tank via a first line,
    a first heat exchanger which is connected to the first pump via a second line and a second heat exchanger which is arranged downstream of the first heat exchanger, and
    a first turbine which is arranged directly downstream of the second heat exchanger,
    wherein a third line branches off from the first turbine and opens in the first heat exchanger and a fourth line branches off from this first heat exchanger and opens in the second line between the first pump and second heat exchanger upstream of the first heat exchanger,
    wherein a second pump is connected in the fourth line,
    wherein a third heat exchanger is connected in the second line and in the fourth line upstream of the second pump.

2. The device as claimed in claim 1, wherein a fifth line branches off from the first turbine and opens in a pipeline.

3. The device as claimed in claim 2, wherein a fourth heat exchanger is connected in the fifth line.

4. The device as claimed in claim 3, wherein a second turbine is connected in the fifth line and the fourth heat exchanger is arranged downstream of the second turbine.

5. The device as claimed in claim 4, wherein a fifth heat exchanger is arranged upstream of the second turbine in the fifth line.

6. The device as claimed in claim 1, wherein the first heat exchanger, third heat exchanger and introduction location of the fourth line into the second line are arranged in an integrated heat exchanger.

7. The device as claimed in claim 1, wherein the tank contains liquid natural gas.

8. A method for power generation, comprising:
    bringing a fluid to a first pressure and consequently producing a high-pressure flow,
    combining the high-pressure flow with a second fluid flow which is greater than the high-pressure flow, into a total fluid flow,
    guiding the total fluid flow to a first heat exchanger, and heating the total fluid flow by the second fluid flow, resulting in a heated total fluid flow,
    subsequently further heating the heated total fluid flow in a second heat exchanger by introducing ambient heat and/or waste heat from other processes, resulting in a further heated total fluid flow,
    expanding the further heated total fluid flow in a first turbine to a lower but supercritical pressure, resulting in an expanded total fluid flow,
    dividing the expanded total fluid flow, which is discharged from the first turbine, into the second fluid flow and into a smaller third fluid flow,
    wherein the second fluid flow, after it has discharged heat to the total fluid flow, is brought to a pressure level of the high-pressure flow, and combined with the high-pressure flow upstream of the first heat exchanger,
    wherein the second fluid flow, before it is brought to the pressure level of the high-pressure flow, is further cooled by a third heat exchanger, wherein the high-pressure flow is heated.

9. The method as claimed in claim 8, wherein the fluid is removed from a tank.

10. The method as claimed in claim 9, wherein by means of a first pump the fluid removed from the tank is brought to a pressure of over 150 bara.

11. The method as claimed in claim 8, wherein the ambient heat is removed from air or seawater.

12. The method as claimed in claim 8, wherein the further heating is carried out to at least 5° C. below ambient temperature.

13. The method as claimed in claim 8, wherein the lower, but supercritical pressure is over 70 bara.

14. The method as claimed in claim 8, wherein the third fluid flow is introduced into a pipeline.

15. The method as claimed in claim 8, wherein multi-stage expansion and intermediate heating are carried out in the first turbine.

16. The method as claimed in claim 9, wherein the fluid removed from the tank is liquid air, liquid natural gas, liquid nitrogen, liquid oxygen or liquid argon.

\* \* \* \* \*